FIG. 1

INVENTOR
H. P. KELLY

INVENTOR
H. P. KELLY
BY *Earl C. Laughlin*
ATTORNEY

United States Patent Office 2,760,155
Patented Aug. 21, 1956

2,760,155

PHASE AND TRANSMISSION MEASURING SYSTEM

Hugh P. Kelly, Watchung, N. J., assignor to Bell Telephone Laboratories, Incorporated, New York, N. Y., a corporation of New York Application January 30, 1953, Serial No. 334,293

8 Claims. (Cl. 324—57)

The invention relates to systems for determining the operation characteristics of electrical equipment, and particularly to a system for measuring and indicating the phase and other transmission characteristics of feedback amplifiers or other transmission equipment used, for example, as component elements of a high frequency carrier communication system.

As is well known, the stability of a feedback amplifier is dependent upon the requirements of phase shift and gain around its feedback loop or $\mu\beta$ path over a wide frequency range, which, for the reasons set forth in "Radio Engineers Handbook" by F. E. Terman, First Edition (page 226, first paragraph), and discussed in more detail in chapter XVIII of "Network Analysis and Feedback Amplifier Design" by H. W. Bode, requires consideration of a substantially higher and wider frequency band than that of the signals which the amplifier is required to amplify with little distortion. For example, it has been found that proper determination of the operation characteristics of the feedback amplifiers of a certain commercial carrier system now being developed for transmitting telephone, music and/or video signals covering a wide frequency range extending up to about 10 megacycles, requires a measurement of insertion phase gain and/or loss over a frequency range extending from about 10 to about 200 megacycles.

One type of automatic direct reading and recording system or set which was devised specifically for measuring quickly and accurately the insertion phase shift and gain or loss of feedback amplifiers in a continuous sweep over a wide frequency range (200 cycles to 3 megacycles) is disclosed in the U. S. Patent of E. W. Houghton, 2,625,589, issued January 13, 1953. This set employs an oscillator with an associated motor-driven frequency varying means as a source of testing voltage that sweeps over the desired range. The signal or testing voltage is applied to a path including the circuit to be tested, and to a reference path whose phase shift equals (or bears a known relation to) that of the first path minus the amount of the phase shift to be measured. Means are provided, responsive to the amplitudes of the output voltages of these paths, for converting the output voltage of each path to the same constant amplitude; for obtaining the sum and difference of these output voltages; for separately rectifying these sum and difference voltages; and for differentially combining the rectified quantities to obtain a resultant that is very nearly linearly proportional to the phase difference between the output voltages of equal constant amplitudes, for values of this phase difference lying between zero and 180 degrees. This resultant is made to operate an indicating or recording meter suitably calibrated to show the phase difference in degrees. The transmission (gain or loss) through the circuit under test is determined by measuring the signal level in the output of that circuit with a gain measuring amplifier-rectifier equipped with an indicating output meter calibrated in decibels on a linear scale.

An object of the invention is to measure and indicate quickly and accurately the insertion phase shift and gain or loss of electrical equipment, such as the feedback amplifiers used in wideband carrier communication systems.

Related objects are to improve a phase and transmission measuring set of the above-described general type from the standpoint of:

(1) Making the set applicable for measuring phase shift and transmission over a wider and higher frequency range, for example, from about 10 to about 200 megacycles;

(2) Ease and speed of operation;

(3) The accuracy of measurment; and (4) Minimizing the overall space requirements of the set.

The phase and transmission measurements in accordance with the invention are accomplished in general by inserting the apparatus to be measured into one of two substantially identical transmission paths, energizing each of the paths at the measurement frequency and comparing the outputs of the two paths with respect to phase and amplitude having converted the outputs of these paths before the comparision is made, by heterodyne action, first to a 5-megacycle intermediate frequency and second to a fixed 50-kilocycle intermediate frequency, comparison then being made at the fixed frequency of 50 kilocycles.

One feature of the invention is the use in such a transmission measuring set of a wide frequency band (say, 10–200 megacycles) heterodyne oscillator arrangement which, in addition to providing the measurment frequencies in that range, provides a second output which is displaced from the measurement frequency exactly by a given frequency (say, 5 megacycles) and which may be used to derive the first intermediate frequency. This arrangement eliminates the errors which are usually associated with imperfect tuning of the beat frequency oscillator, ambiguity of tuning which results from image frequency response, and also obviates the necessity for using servo mechanisms or slave oscillator schemes to insure proper tracking between the measurement and demodulating frequencies.

A second feature of the invention is the use in the measuring system of the invention, of two like phase indicating circuits, each with its own phase meter, and a 90-degree phase shifter to provide the following advantages over the prior art systems:

(1) All ambiguity as to the sign of the angle being indicated is removed;

(2) The length of the phase scale is effectively doubled; and (3) Improved accuracy and linearity of scale are obtained.

Another feature is the use with an amplifier in each phase indicating circuit of a special automatic gain control circuit (AVC) to maintain its output constant. This new automatic gain control circuit includes means for comparing directly the peak-to-peak amplitude of the A.-C. voltage in the output of the amplifier with a reference fixed D.-C. voltage and transmitting only that part of the A.-C. voltage wave which exceeds the D.-C. voltage, so as to produce a series of wave "pips" whose amplitude is proportional to the difference between the peak-to-peak amplitudes of the two voltages. These pips are amplified, rectified and applied as a bias to the controlled amplifier. Since amplification is accomplished on an A.-C. basis, this system is considerably more stable than conventional systems using direct coupled amplifiers which are subsject to contact potential drifts, and avoids the power supply complications which are inherent in D.-C. amplifier design.

The various objects and features of the invention will be better understood from the following detailed description of one embodiment thereof when read in conjunction with the accompanying drawings in which.

Figure 1:
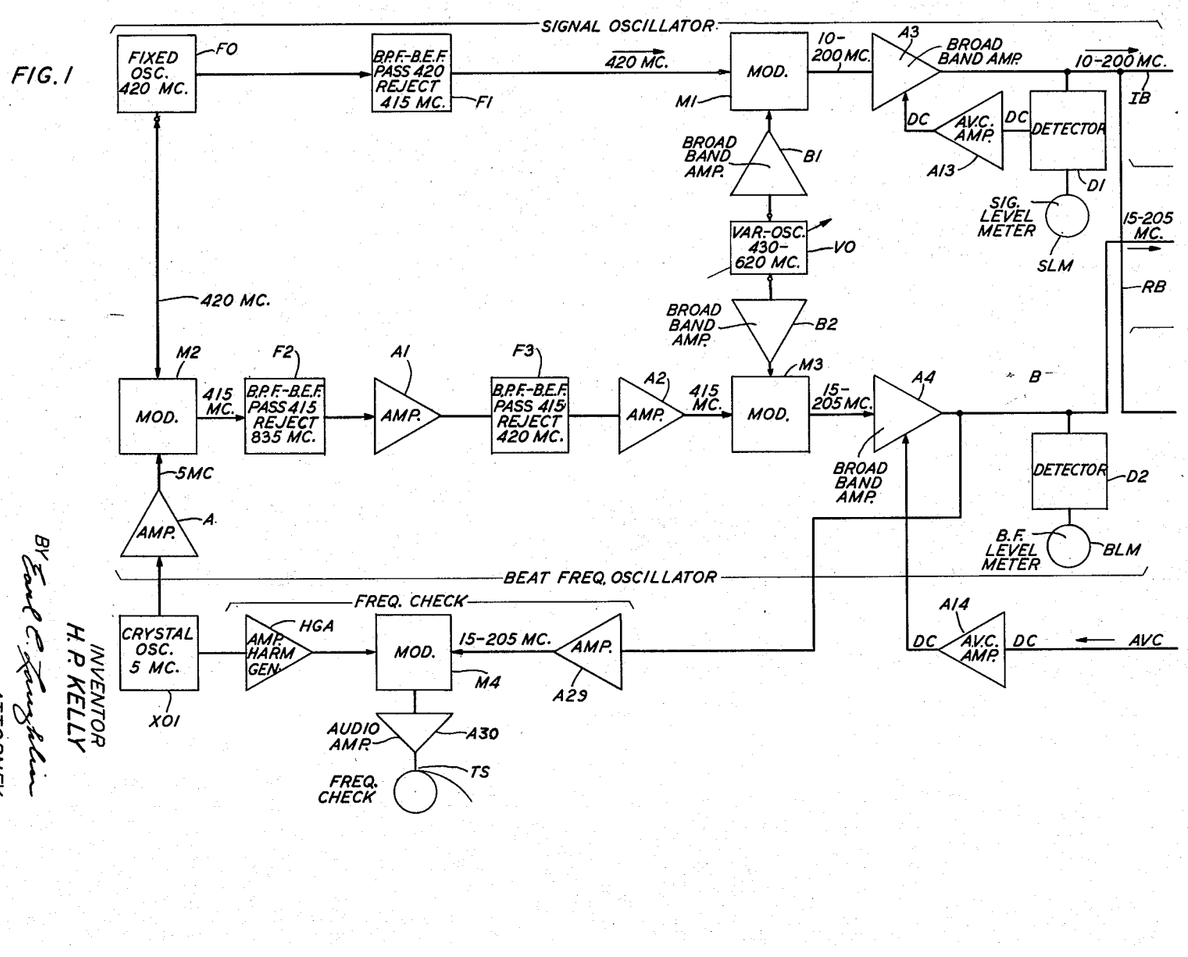
Figs. 1 to 3 in combination show schematically, partially in block diagrammatic form, one embodiment of a complete phase and transmission measuring set in accordance with the invention.
Figure 2:
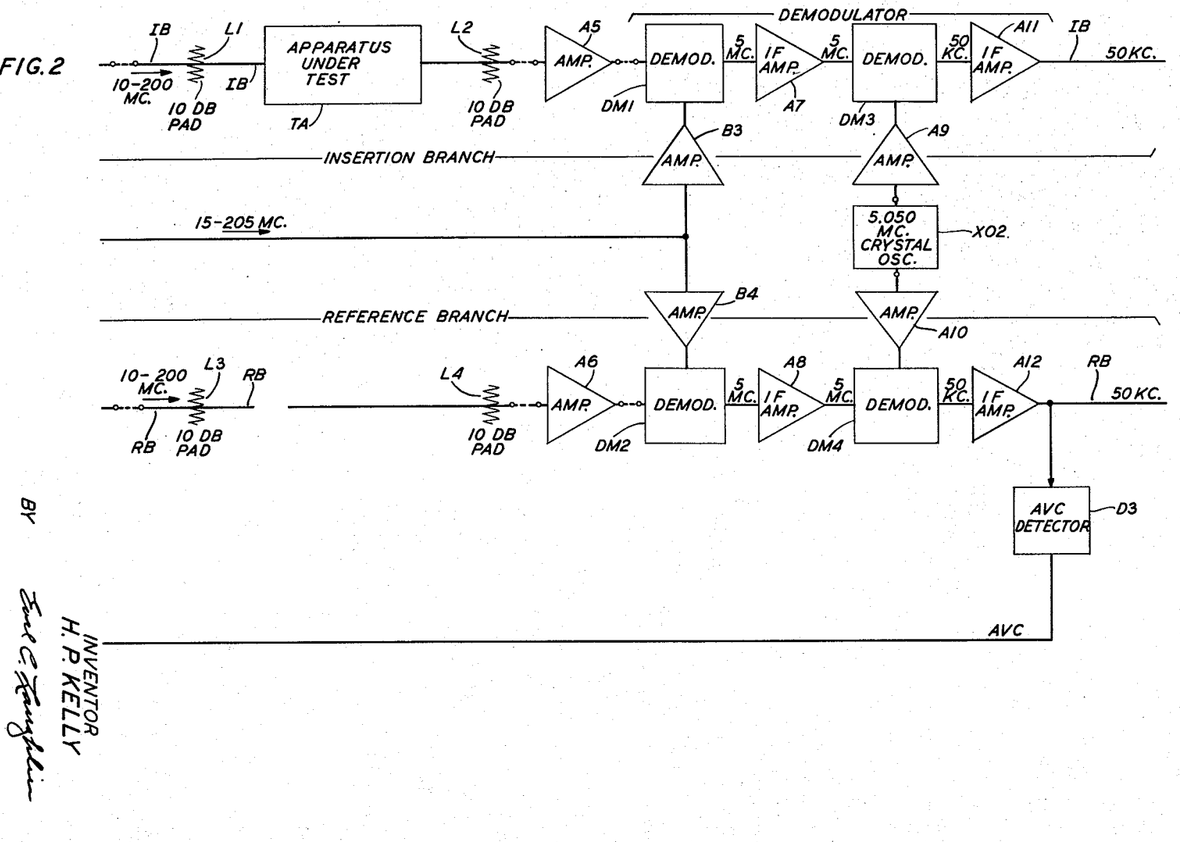
Figure 3:
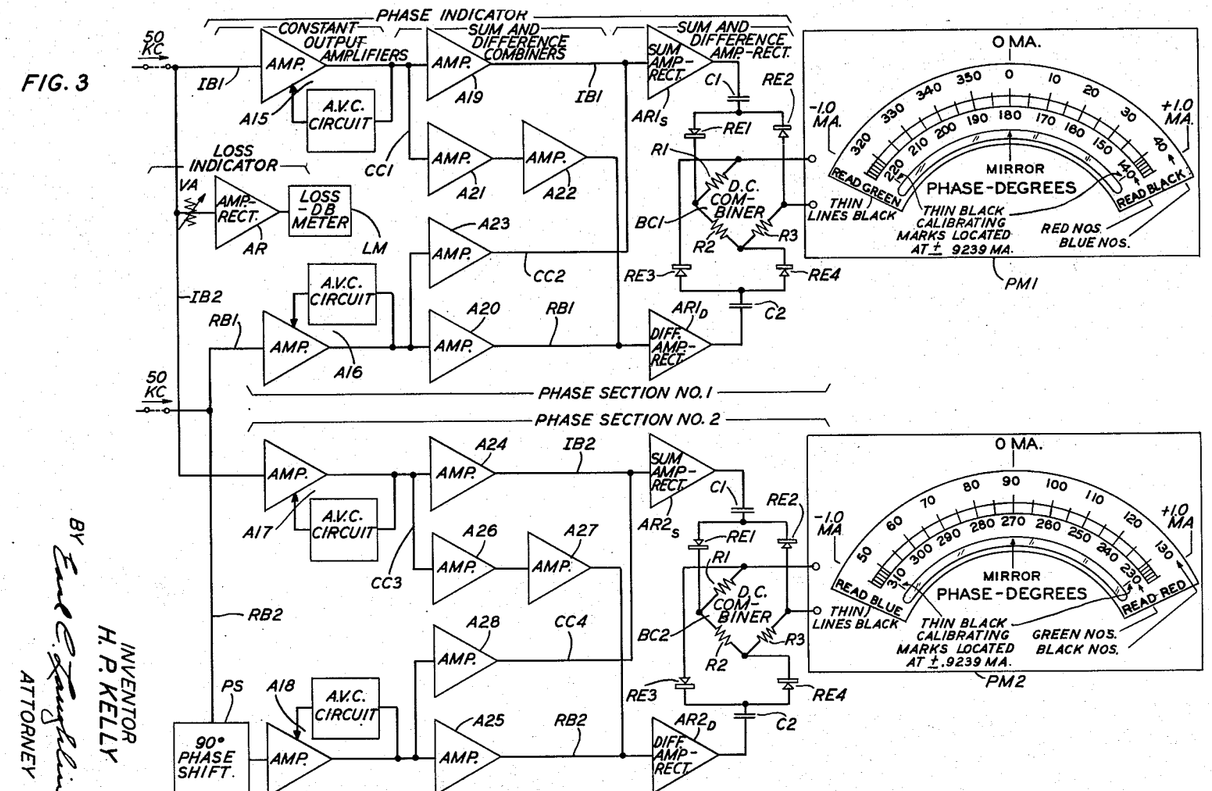

Figs. 1 to 3, taken together with Fig. 1 to the left of Fig. 2 and Fig. 3 to the right of Fig. 2, form a schematic circuit diagram of an automatic measuring and indicating system embodying one form of the invention, which was devised specifically for measuring and indicating quickly and accurately the insertion phase and the insertion gain or loss of the feedback loops of the feedback amplifiers used in the above-referred to commerical carrier communication system for transmitting signals covering a wide frequency range up to about 10 mc., but which is of general application for measuring the insertion phase shift and insertion gain or loss of other types of electrical equipment over a wide frequency range.

The system of Figs. 1 to 3, as shown, comprises four main sections in tandem, which will be referred to as: (A) oscillator section, shown in Fig. 1; (B) external circuits section and (C) demodulator section, both shown in Fig. 2; and (D) phase indicator section, show in Fig. 3. The system in general and the component apparatus in each of the several sections, having new features will now be described under appropriate headings.

GENERAL

A 10–200-megacycles heterodyne oscillator shown in block schematic form in Fig. 1, is used as a signal source for both phase and transmission measurements. It consists of the 420 mc. fixed frequency oscillator FO, the combined band-pass and band-elimination filter F1, the 430–620 mc. variable frequency oscillator VO, the broadband signal buffer amplifier B1, the signal modulator M1 and the broad-band signal amplifier A3 having an associated AVC control for maintaining its output voltage constant. One 420 mc. output from fixed oscillator FO is passed through the filter F1 which is adapted to pass 420 mc. and reject 415 mc. The 420 mc. output of filter F1 is combined in modulator M1 with the oscillations varying from 430–620 mc. received from oscillator VO through buffer B1, to produce oscillations varying from 10 to 200 mc. which are amplified in the amplifier A3.

A 15–205 mc. heterodyne oscillator is derived by taking another portion of the 420 mc. output of the fixed oscillator FO and modulating it in the modulator M2 with oscillations of 5 mc. obtained from the output of the crystal-controlled oscillator XO1 through the amplifier A. The 415 mc. lower sideband output from this modulator M2 is amplified and filtered in the circuit comprising in tandem the combination band-pass and band-elimination filter F2, amplifier A1, combination bandpass and band-elimination filter F3, and amplifier A2. The 415 mc. output of this circuit, together with the 430–620 mc. variable frequency oscillator VO, the broadband buffer amplifier B2, modulator M3 and amplifier A4 having an associated AVC control, forms the 15–205 mc. beat frequency oscillator. The 415 mc. wave in the output of amplifier A2 is combined in the modulator M3 with the oscillations varying from 430–620 mc. received from the variable oscillator VO through buffer amplifier B2 to produce oscillations varying from 15–205 mc. which are selected and amplified in the amplifier A4. The frequency of these oscillations will always differ from the output frequency of the 10–200 mc. heterodyne oscillator by the 5 mc. frequency of the crystal oscillator XO1.

A detector D1 bridged across the output of the amplifier A3 detects a portion of the 10–200 mc. output thereof and operates the signal level meter SLM to give an indication of the output of that amplifier, and also provides a separate D.-C. signal which, after amplification by the following D.-C. amplifier A13, is applied as an AVC voltage to the amplifier A3 (for example, as a bias to the grids of the amplifier tubes therein) in the main transmission path to maintain the output voltage of that amplifier substantially constant.

Another detector D2 bridged across the output of the amplifier A4 in the 15–205 mc. beat frequency oscillator detects a portion of the 15–205 mc. beat frequency current, which is used to operate the associated meter BLM to give an indication of the level of the current in the output of amplifier A4.

Another portion of the 10–200 mc. output of the amplifier A3 in the first heterodyne oscillator above described is used to energize the two transmission circuit branches, which will be referred to hereinafter as insertion branch IB and reference branch RB, in parallel. The 10–200 mc. signals impressed on the insertion branch IB are passed through the apparatus under test, TA, inserted in that branch between the two 10 db. loss pads L1 and L2, are amplified in the amplifier A5 and are then supplied to one input branch of the first demodulator DM1 in the demodulator section of the insertion branch IB. The 10–200 mc. signals impressed on the reference branch RB are passed through the 10 db. loss pads L3 and L4, are amplified in the amplifier A6 and are then supplied to one input branch of the first demodulator DM2 in the demodulator section of the reference branch RB.

The two signals, which have been transmitted through the external circuits of the insertion branch IB and the reference branch RB to the demodulators DM1 and DM2 in the respective branches, now differ in phase and amplitude by the difference in phase shift and transmission through the two branches. The insertion phase and transmission of the apparatus to be measured, TA, may be determined by observing the change in phase and transmission which occurs at this point when that apparatus is inserted in the insertion path. These measurements of phase and transmission can be accomplished more easily, however, at a fixed low frequency. It is the purpose, therefore, of the demodulator section to translate the measurement frequency in each of the two branches to the same constant low frequency.

The 15–205 mc. output of amplifier A4 in the 15–205 mc. beat frequency oscillator above described, is transmitted through separate buffer amplifiers B3 and B4 to the second input branches of the demodulators DM1 and DM2, respectively, in the insertion branch IB and the reference branch RB, respectively, in which demodulators they are combined with the 10–200 mc. signals applied to the first input branches of these demodulators to translate the signal frequency in each branch to the 5-mc. first intermediate frequency.

The 5-mc. intermediate frequency signals in the outputs of the demodulators DM1 and DM2 in the branches IB and RB are selected and amplified in the intermediate frequency amplifiers A7 and A8, respectively, and then are respectively passed to one input branch of the second demodulators DM3 and DM4 in IB and RB, respectively. In each of the demodulators DM3 and DM4, the 5-mc. intermediate frequency signal is translated to a fixed frequency of 50 kilocycles by combination therein with a heterodyning frequency of 5.050 mc. received by a second input branch from the crystal-controlled oscillator XO2 through the buffer amplifiers A9 and A10, respectively. The 50-kc. wave in the output of demodulator DM3 in branch IB is then selected and amplified by the amplifier A11, and the 50-kc. wave in the output of the demodulator DM4 in the reference branch RB is selected and amplified by the amplifier A12.

A third detector D3 bridged across the output of the amplifier A12 in reference branch RB, operates to detect a portion of the 50-kc. signal in the ouput of that amplifier to provide a D.-C. signal, which, after amplification in the D.-C. amplifier A14 is applied as an AVC voltage to the amplifier A4 in the 15–205 mc. beat frequency oscillator. This provides a means for adjusting the output of the beat frequency oscillator to maintain, by AVC action, a constant level in the output of the demodulator reference branch. Since changes in the output level of the beat frequency oscillator have equal effects on the transmission through both branches IB and RB, the measurements of transmission at the output of the demodulator insertion branch IB are independent of the output level of the 10–200 mc. signal oscillator.

A loss indicator circuit connected across the output of the amplifier A11 in the main insertion branch IB is used for measuring the amplitude of the 50-kc. wave in the amplifier output. As shown, it includes a variable attenuator VA in its input followed by an amplifier-rectifier AR and the loss meter LM calibrated to read in decibels. The change in the amplitude of this 50-kc. wave indicated on the meter LM when the apparatus to be measured, TA, is inserted in the insertion branch IB provides a measurement of the gain or loss of that apparatus.

Figure 6:
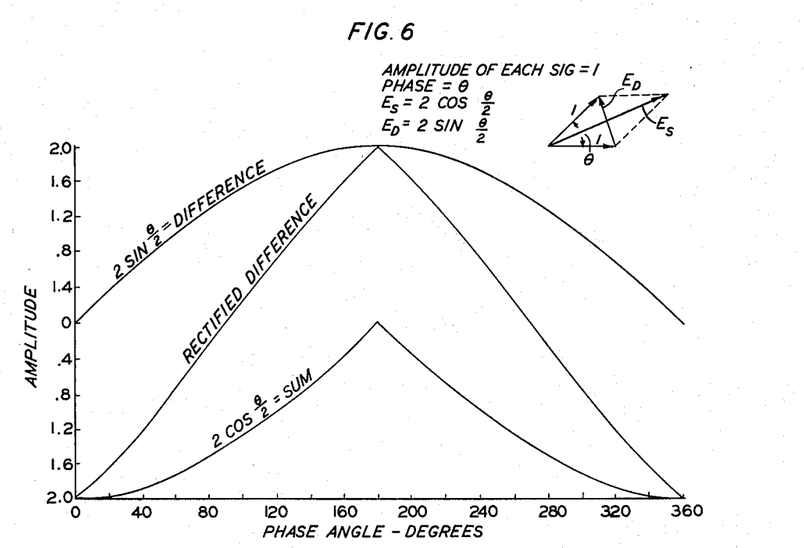
Figs. 6 and 7 show curves used to explain the operation of the meters which are employed in the phase indicating circuits in accordance with the invention in the system of Figs. 1 to 3.

The two outputs received from the amplifiers A11 and A12 in the main branches IB and RB, respectively, differ in phase by amounts equal to the difference in phase shift and transmission between these two branches. A direct indication of the insertion phase of the apparatus TA is provided by the phase indicator which, as shown, comprises two identical phase sections 1 and 2 each with its associated phase meter PM1 and PM2, respectively. Each of these sections operates on the principle that the difference between the rectified vector sum and difference of two sine waves of equal amplitude is approximately a linear function of their phase difference. The cruves of Fig. 6 show the relationship between these quantities. Each phase section 1 and 2, as shown, has two inputs, one from the main insertion branch IB and one from the main reference branch RB. The insertion branch IB1 of phase section 1 is energized by one portion of the 50 kc. output of amplifier A11 in the main insertion branch IB. The reference branch RB1 of phase section 1 is energized by one portion of the 50 kc. output of amplifier A12 in the main reference branch RB. Similarly, the insertion branch IB2 and the reference branch RB2 of phase section 2 are energized by the other portions of the 50 kc. output of the amplifier A11 in the main insertion branch IB and of the amplifier A12 in the main reference branch RB, respectively. A 90-degree phase shifter PS is inserted in the input of the reference branch RB2.

Each of the signals in the insertion and reference branches IB1, RB1, IB2 and RB2 is amplified to a constant and equal amplitude by the constant output amplifiers A15, A16, A17 and A18, respectively, because of the AVC control circuit associated with each of these amplifiers. These control circuits are all identical and will be described later.

After the signals in the insertion and reference branches in each phase section 1 and 2 have been adjusted to constant and equal amplitudes in the constant output amplifiers A15, A17, A16 and A18, the vector sum and vector difference of the two signals are obtained in the sum and difference combiners of the two phase sections. The sum and difference combiner of phase section 1 comprises an amplifier A19 following the constant output amplifier A15 in IB1 and an amplifier A20 following the constant output amplifier A16 in RB1; a cross-control circuit CC1 including the one-way amplifiers A21 and A22 in tandem connecting the input of amplifier A19 in IB1 to the output of amplifier A20 in RB1; and a cross-control circuit CC2 including the one-way amplifier A23 connecting the input of amplifier A20 in RB1 to the output of amplifier A19 in IB1, as shown. The sum and difference combiner of phase section 2 comprises an amplifier A24 following the constant output amplifier A17 in IB2 and an amplifier A25 following the constant output amplifier A18 in RB2; the cross-control circuit CC3 including the one-way amplifiers A26 and A27 in tandem, connecting the input of amplifier A24 in IB2 to the output of amplifier A23 in RB2; and the cross-control circuit CC4 including the one-way amplifier A28, connecting the input of amplifier A25 in RB2 to the output of amplifier A24 in IB2.

The vector sum of the two 50 kc. signals obtained by adding the output of amplifier A23 in the reference path RB1 to the output of the amplifier A19 to IB1, is amplified and rectified in the sum amplifier-rectifier AR1s in phase section 1. The vector difference of these two 50 kc. signals obtained by adding the output of the amplifier A22 in IB1 to the output of the amplifier A20 in RB1, is amplified and rectified by the difference amplifier-rectifier AR1$_D$ in phase section 1. Similarly, in phase section 2 the vector sum of the two 50 kc. signals obtained by adding the output of the amplifier A28 in the reference branch RB2 to the output of the amplifier A24 in IB2 is amplified and rectified in the sum amplifier-rectifier AR2s in phase section 2. The vector difference of the two 50 kc. signals obtained by adding the output of the amplifier A27 in IB2 to the output of the amplifier A25 in RB2 is amplified and rectified in the difference amplifier-rectifier AR2$_D$. The rectified sum and rectified difference in the outputs of the sum and difference amplifier-rectifiers AR1s, AR1$_D$, AR2s and AR2$_D$ of phase sections 1 and 2, respectively, are then combined in the direct current bridge combining circuits BC1 and BC2, respectively, each of which derives the D.-C. difference between the two rectified quantities and supplies it to the associated phase meter, PM1 or PM2, respectively, which measures the difference current.

As shown, each of the bridge combining circuits BC1 and BC2 may comprise a four-arm bridge with equal resistors R1, R2 or R3 in each of three of its arms, and the input of the associated meter PM1 and PM2 forming the fourth arm. The outputs of each of the sum and difference amplifier-rectifiers of phase sections 1 and 2, are connected through a capacitor C1 and C2, respectively, and a different pair of oppositely poled parallel-connected rectifiers RE1 and RE2, and RE3 and RE4, respectively, in series to a different pair of opposite vertices of the bridge, so that the difference between the outputs of the two amplifier-rectifiers appears in the input of the associated meter PM1 or PM2.

As indicated in Fig. 3, the phase meters PM1 and PM2 are each calibrated directly in degrees of phase. Each meter has two colored scales. Each scale covers a range of 90 degrees. The 90-degree phase shifter PS in the input of the reference branch RB2 of phase section 2 displaces the phase reading of that section 90 degrees with respect to the reading of phase section 1. Thus, one of the two meters is always off scale and the other on scale. Both ends of the scale on both meters PM1 and PM2 are so marked that when a meter reading is off scale, the direction in which it is off indicates the proper scale to read on the other meter. Thus, a full 360 degrees is covered by the four scales of the two meters.

Figure 7:
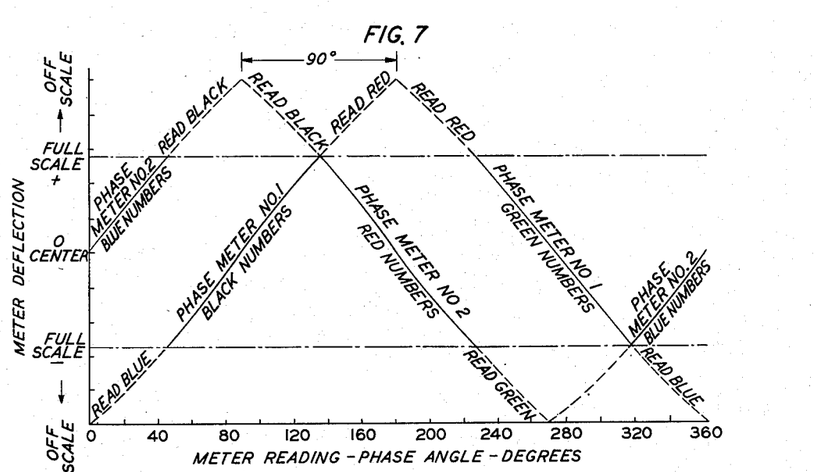

The phase meters PM1 and PM2 are zero center, ±1.0 milliampere meters equipped with phase scales. The scales of the meters PM1 and PM2 are calibrated in accordance with the phase versus amplitude law indicated by the curves of Fig. 6. The levels in the two phase sections are so adjusted by the amplifiers therein that the difference between the two extremes of each phase scale in each meter is 90 degrees. This means that for the relationships shown on Fig. 6, the meter PM2, for example, will be off the scale to the left for phase angles between 0 and 45 degrees, on scale between 45 and 135 degrees, off scale to the right between 135 and 225 degrees, on scale between 225 and 315 degrees, and off scale to the left between 315 and 360 degrees. Similarly, the meter PM1 will give on-scale readings for all angles for which meter PM2 is off scale. The two meters are displaced 90 degrees from each other by means of the 90-degree phase shifter PS in the input of the reference branch RB2 of phase section 2. This use of two phase sections and two meters provides: (1) a full 360-degree coverage; (2) operation of the phase sections in their most linear and accurate range; (3) a two-to-one spread in meter scale; and (4) a system whereby the proper quadrant of phase is specified by the meter which is off scale. The relation between phase in degrees and the meter deflections for two phase sections spaced 90 degrees apart is shown in the curves of Fig. 7.

A frequency checking system is incorporated in the 15-205 mc. heterodyne oscillator of the oscillator section as shown in Fig. 1. This system compares the oscillator frequency with harmonics of the 5-mc. frequency produced by the crystal oscillator XO1 and provides for precise setting of the oscillator frequency at 2.5 mc. intervals throughout the band. As shown in Fig. 1, a portion of the output from the 5 mc. crystal oscillator XO1 is transmitted through the combined buffer amplifier and harmonic generator HGA, which may be of any of the well-known types. Means would be provided in the output of HGA for selecting any desired harmonic of 5 mc., which is supplied to one input of the modulator M4. A portion of the 15-205 mc. output of the broad-band amplifier A4 is transmitted to a second input of the modulator M4 through the amplifier A29. The selected harmonic of the 5-mc. wave and the 15-205 mc. wave are combined in the modulator M4, and the combination wave produced in the output of that modulator would be amplified in the audio amplifier A30 and supplied to a telephone set TS. A phone jack and a "frequency check" switch (not shown) for turning the buffer amplifier A30 and harmonic generator HGA on and off may also be provided. The accuracy of the frequency scale of the variable oscillator VO may be checked by operating the frequency check switch to the "on" position and then tuning the set to zero beat in the headphones of the telephone set TS. Thus, the operator of the measuring circuit is enabled to check the setting of the 15-205 mc. frequency to any harmonic of the 5-mc. crystal controlling the frequency of the oscillator XO1, between 15 and 205 mc.

The equipments which may be used for the various apparatus elements of the measuring set indicated by the labeled boxes in Figs. 1 to 3, which have new features, are described in more detail in the following paragraphs under appropriate headings.

*Variable and fixed frequency oscillators.*

The high frequency oscillators VO and FO used in the heterodyne oscillators of Fig. 1 are based on a cylinder circuit developed by E. Karplus of the General Radio Company and described in an article by him published in the Proceedings of the Institute of Radio Engineers for July 1945. This oscillator circuit was modified to provide shaping of the inner cylinder to obtain a logarithmic frequency scale for the heterodyne oscillators.

Figure 8:
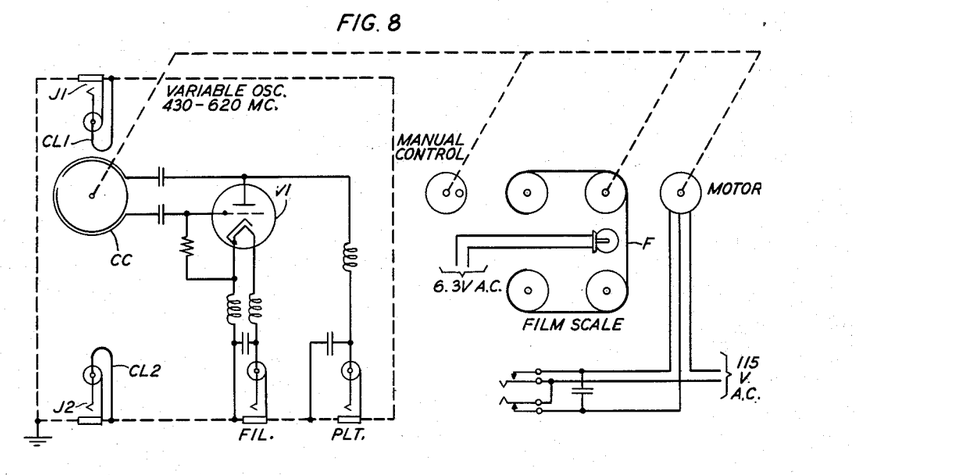
Fig. 8 and 9 show schematically the circuit of one type of variable frequency oscillator and the circuit of one type of fixed frequency oscillator, respectively, which may be used in the oscillator section of the system of Figs. 1 to 3, and the means used for coupling those oscillators to the associated equipment.

The variable oscillator VO is common to both of the heterodyne oscillators (10-200 mc. and 15-205 mc.) in the oscillator section (Fig. 1) and provides a means for varying the output frequency of both of these oscillators simultaneously over their entire frequency range without band switching. The frequency range of the variable oscillator VO is set at 430-620 mc. to avoid third order spurious products. The frequency scale of the variable oscillator VO used in the embodiment of the system constructed and tested, as shown in Fig. 8, was a calibrated motion picture film F approximately 22 feet long. This provides a means for adjusting the set to the desired measurement frequency. This scale covered a range of 10-200 mc. with 0.1 mc. divisions from 10-120 mc., and 0.2 mc. divisions from 120-200 mc. The circuit used for this oscillator is shown schematically in Fig. 8 and consists, as shown, of a planer-grid, disc-sealed triode V1, tuned between its grid and plate by a cylinder circuit CC. The cylinder circuit CC consists of two coaxial, slotted cylinders one of which rotates inside the other. The equivalent of a parallel tuned I-C circuit is formed across the slot of the outer cylinder. The variation of resonant frequency is accomplished by rotating the inner cylinder with respect to the outer. The law of frequency variation versus rotation is determined by the shape of the inner cylinder. The inner cylinder of this oscillator was designed to effect an approximate logarithmic variation of the 10-200 mc. output of the heterodyne oscillator. The output of the oscillator is coupled to the circuit by means of two coupling loops CL1 and CL2 mounted on an aluminum housing. The loop CL1 terminating in jack J1 provides means for coupling to the 10-200 mc. heterodyne oscillator. The loop CL2 terminating in jack J2 provides means for coupling to the 15-205 mc. heterodyne oscillator. Plate and filament power is supplied to the oscillator coaxially from filters mounted on a filament supply panel (not shown).

Figure 9:
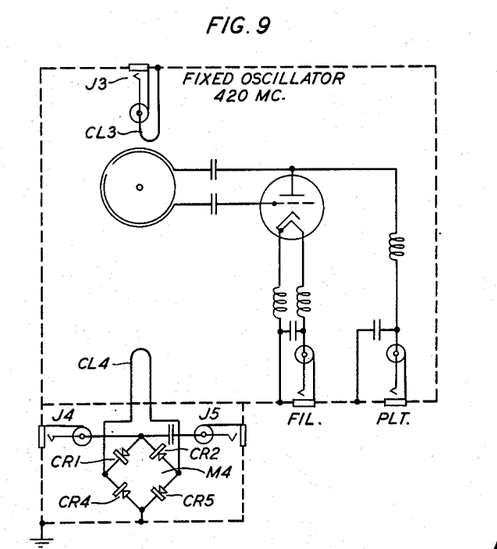

The 420 mc. fixed oscillator FO may be mechanically identical to the variable oscillator VO described above except that it has no provision for a film scale. The circuit of this oscillator is shown in Fig. 9. As shown, it has two coupling loops CL3 and CL4. One loop CL3, which terminates in jacks J3, provides for coupling the output of the oscillator to the input of the filter F1 in the 10-200 mc. frequency generating circuit (Fig. 1). The other loop CL4 connects to one input of the modulator M2 in which the applied 420 mc. wave is combined with the output from the 5 mc. oscillator XO1 to produce the 415 mc. source for the 15-205 mc. generating circuits (Fig. 1).

*415 mc. modulator*

The 415 mc. modulator M2, as shown in Fig. 9, may consist of four silicon varistors CR1, CR2, CR3 and CR4 arranged in a four-arm bridge and poled as indicated. The jacks J4 and J5 are provided for coupling the output of the amplifier A fed from the 5-mc. crystal oscillator XO1, and the input of the filter F2 across the other diagonal of the bridge, respectively. The other modulators M1, M3 and M4 in the oscillator section (Fig. 1), and the demodulators DM1, DM2, DM3 and DM4 in the demodulator section as shown in Fig. 2 may have a construction similar to that of the modulator M2.

*Filters*

The filter F2 may consist of a short-circuited coaxial line bridged across the main transmission path. The electrical distance between the bridging point and the short circuit would be one-half wavelength at 835 mc. This provides a filter which will transmit 415 mc. but will reject 835 mc. The 835 mc. is a 2 *a-b* modulation product where *a* equals 420 mc. and *b* equals 5 mc. The third order product if not suppressed would combine with the 415 mc. in the beat frequency modulator to produce a difference frequency of 420 mc., which would cause a small amount of signal frequency contamination in the beat frequency path which would tend to cause measurement errors. The filter F3 may have a construction similar to that of the filter F2 as described above but would be designed to transmit 415 mc. and reject 420 mc.

The filter F1 may have a construction similar to that of the filters F2 and F3, but should be designed to transmit the 420 mc. signal and suppress any 415 mc. components which might be transmitted from the 415 mc. modulator M2 through the fixed frequency oscillator FO.

AVC amplifiers

Figure 4:
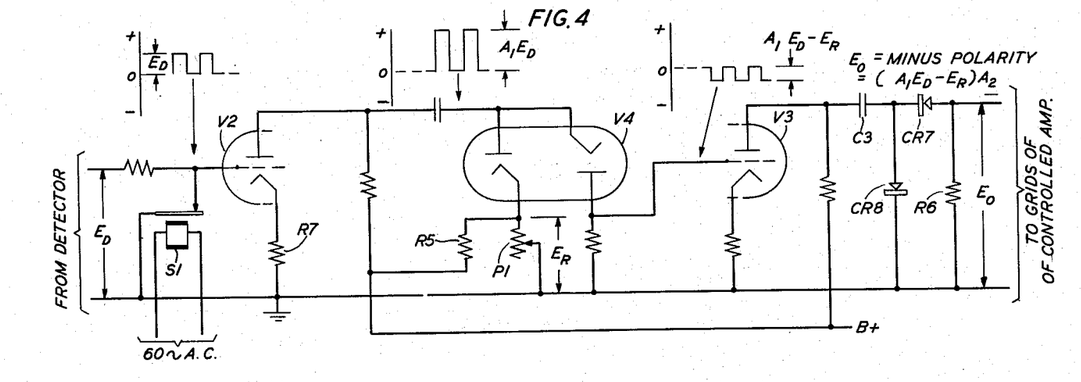
Figs. 4 and 5 respectively show different AVC control circuits in accordance with the invention, which are associated with some of the amplifiers used in the system of Figs. 1 to 3.

The circuit of the AVC amplifier A13 or A14 which are associated with the signal and beat frequency amplifiers, A3 and A4, respectively, of the oscillator section (Fig. 1) is shown in Fig. 4. As shown in that figure, this circuit includes a vibrating relay S1, the three-electrode amplifying vacuum tube stages V2 and V3, which may be included in a common envelope, and a twin diode V4. The D.-C. voltage output $E_D$ of the detector at the point to be controlled (detector D1 or D3 of Figs. 1 and 2, respectively) is interrupted by the relay S1 at a 60-cycle rate from a 60-cycle vibrating source (not shown). The resulting 60-cycle square waves have a peak-to-peak amplitude which is equal to the amplitude $E_D$ of the D.-C. signal received from the associated detector. These square waves are amplified in the amplifying stage V2. The output of V2 is compared on a peak-to-peak basis with a D.-C. reference voltage in the diode circuit V4. No transmission takes place through the diode circuit V4 until the peak-to-peak value of the square wave applied to it exceeds the reference voltage $E_R$ which is applied, as shown, as a bias through resistor R5 to one of the cathodes of the diode circuit V4. However, when the amplitude of the square wave exceeds the value of the reference voltage, the difference in amplitude between this wave and the reference voltage is transmitted as a square wave to the control grid of the second amplifying stage V3. The output of this second stage V3 is filtered and rectified in the circuit comprising the series condenser C3, series rectifier CR7 and shunt rectifier CR8, and is applied across shunt resistor R6 as a biasing voltage $E_0$ to the grids of the amplifier tubes being controlled (A3 or A4). As indicated on Fig. 4, $E_0 = (A_1 E_D - E_R) A_2$, where $A_1$ and $A_2$ are the amplification factors of tubes V2 and V3, respectively. This provides a delayed AVC system which avoids the use of direct coupled amplifiers and permits the use of a stable D.-C. voltage as a reference level. The potentiometer P1 and resistor R5 provide means for adjusting the amount of the D.-C. reference voltage applied to the diode circuit. This controls the AVC threshold and consequently the output level of the amplifier being controlled.

Figure 5:
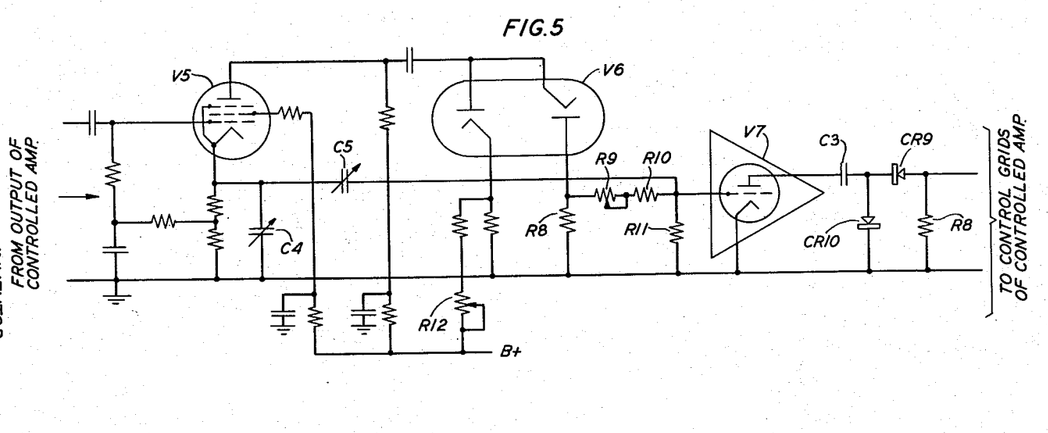

The circuit of a delayed AVC system associated with each of the constant output amplifiers A15, A16, A17 and A18 in the branches IB1, RB1, IB2 and RB2, respectively, of phase sections 1 and 2 is shown in Fig. 5. As shown, this circuit consists of an amplifying tube V5, a twin diode tube V6, amplifier V7, which may comprise one or more vacuum tube stages, and the rectifiers CR9 and CR10, which may be germanium varistors, in tandem. The operation of this circuit in providing the delayed AVC is as follows: (1) the output from the constant output amplifier A15, A16, A17 or A18 in the insertion or reference branch of each phase section is first amplified in the buffer amplifier V5; (2) the peak-to-peak value of the output from V5 is compared in the diode tube V6 with a D.-C. voltage applied to one of the cathodes of that tube. This D.-C. voltage provides a back-bias on the diode circuit and prevents transmission of the A.-C. signal from the output of tube V5 through the cathode-to-plate of the output diode of the tube V6 except when the peak-to-peak value of the A.-C. signal exceeds the bias voltage. This results in a series of voltage pips, one for each A.-C. cycle, across the load resistor R8 in the output of the twin diode V6. Each pip represents the amount that the peak-to-peak value of its cycle exceeds the bias voltage. At this point, the pips contain unwanted portions of the original A.-C. wave due to transmission through the cathode-to-plate capacity of the diode. This A.-C. component is removed by: (1) attenuating the output of the twin diode V6 by means of the series resistors R9, R10, R11 by an amount equal to the ratio between the signal levels at the cathode and plate of the amplifier tube V5; (2) adjusting, by means of the variable capacitor C4 connected across the cathode resistor of the amplifier tube V5, the phase of the signal appearing at the cathode of the tube V5 so that it is exactly 180 degrees out of phase with the signal at the plate of that tube; (3) combining this cathode signal with the attenuated output of the twin diode V6 through the capacity of the variable capacitor C5 connected between the cathode of tube V5 and the control grid of the first amplifier stage in amplifier V7. The capacity of the variable capacitor C5 is adjusted to be equal to the cathode-to-plate capacity of the diode tube V6. This provides a cancellation of the contaminating A.-C. signal component with the result that only the D.-C. pips appear across the load resistor R11 shunting the grid and cathode of the input tube of amplifier V7. The adjustable resistor R12 connected between the positive terminal of the D.-C. voltage source and the cathode of the first diode of tube V6 provides a means of adjusting the value of the back-bias on the diodes and therefore the AVC threshold of the system. The resulting pips are amplified in the two-stage amplifier V7 and rectified by the following rectifiers (CR9 and CR10). The rectified output of this circuit is filtered and applied as a bias to the grids of the associated constant output amplifier tube A15, A16, A17 and A18. It can be seen that this AVC system provides no bias on the grid of a controlled amplifier tube until the output of that amplifier exceeds the critical value provided by the adjustable potentiometer control R12 for the AVC circuit just described. However, when the output does exceed this critical value, bias is provided to reduce the gain of the controlled amplifier and thus tends to hold its output constant. The gain of the AVC system is made sufficient to maintain the output of the controlled amplifier constant to ±0.1 db for input levels which vary from 0 dbm to −50 dbm.

The above-described scheme of comparing an A.-C. wave with a D.-C. reference voltage and deriving a differential A.-C. output has other possible applications. For example, it could be used as a stable expanded scale detector; to obtain a range of amplifier outputs which would be precisely determined by an adjustable D.-C. reference voltage; or as a simple but accurate level control.

The material just discussed with reference to Figs. 4 and 5 forms the subject matter of divisional application Serial No. 548,108, filed on November 21, 1955.

The other amplifiers and other apparatus elements of the phase and transmission measuring set of Figs. 1 to 3, illustrated by the labeled boxes but not specifically described above may be of any suitable types.

The phase and transmission measuring set of the invention just described covers a frequency range of 10–200 mc. It will provide the direct readings of insertion phase over a range of 0–360 degrees. It will provide a range of transmission measurements from +10 dbm to −40 dbm. The phase accuracy of the set is of the order of ±1.0 degrees except for transmission measurements which involve transmission losses approaching 40 db. In such cases, the maximum phase error approaches ±2.0 degrees. The accuracy of transmission measurements is of the order of ±0.2 db.

It is understood that the values of the component apparatus elements of the set and the values of the frequencies of the waves adapted for measurement thereby may vary somewhat from those specified above. Various modifications of the circuits described above and illustrated in the drawings which are within the spirit and scope of the invention will occur to persons skilled in the art.

What is claimed is:

1. A system for making phase and transmission measurements on transmission apparatus over a wide frequency range comprising two substantially identical transmission paths into one of which said transmission apparatus is inserted, means for supplying to the inputs of both of said paths the same measuring signal variable in frequency over said wide frequency range, means associated with each of said paths for converting the supplied measuring signals therein, by heterodyne action, first with a wave derived from the measuring signal and always displaced in frequency therefrom exactly by a given lower frequency, to said given lower frequency and then to a fixed low frequency and means for comparing the outputs of the two paths with respect to phase and amplitude at said fixed low frequency.

2. The system of claim 1, in which the source of measuring signals is a heterodyne oscillation generator including a first oscillator generating a wave of fixed frequency, a second oscillator generating a wave of variable frequency, a first modulation means for combining one energy portion of the output wave of said one oscillator with one energy portion of the output wave of said second oscillator to produce combination waves which are supplied to the inputs of said two paths, the frequencies of the waves generated by the first and second oscillators being such that said combination waves produced by said first modulation means cover the desired wide range of measuring signal frequencies, and said converting means comprises a third oscillator generating a wave of said given frequency, a second modulation means for combining the wave of said given frequency generated by said third oscillator with a second energy portion of the wave generated by said first oscillator to produce combination waves, means for selecting and amplifying the lower sideband component of the latter combination waves and a third modulating means for combining the resulting wave with a second energy portion of the output wave of said second oscillator to produce said wave always displaced in frequency from the measuring signal of variable frequency supplied to said two paths, by said given lower frequency, which is used to derive the wave of said given lower frequency.

3. A system for making insertion phase and transmission measurements on transmission apparatus, comprising two substantially identical transmission paths into one of which said apparatus is adapted to be inserted, a heterodyne oscillation generator for generating and supplying to the inputs of both of said paths equal energy portions of a measuring signal wave of a frequency variable over a wide frequency range, means for deriving from the output of said generator other waves of a frequency which is at all times displaced from that of the generated measuring signal wave by exactly a given frequency lower than the lowest frequency in said range, an auxiliary source of waves of a frequency equal to said given frequency plus a fixed low frequency, modulating means in said one path beyond the point of connection of said transmission apparatus therein and in the other path, for respectively combining the applied signal wave in each path with a portion of said other waves to translate the signal wave first to said given frequency and for then combining the resulting wave with a portion of the waves from said auxiliary source to translate the signal wave to said fixed low frequency, a 90-degree phase shifter, a phase indicator for comparing the outputs of the two paths at said low frequency with said transmission apparatus inserted in said one path and said 90-degree phase shifter effectively inserted in the other path, and for indicating the difference therebetween as a measure of the insertion phase of said apparatus and means for indicating the change in amplitude occurring in the low frequency wave in the output of said one path due to said apparatus being inserted therein, as a measure of the insertion gain or loss of that apparatus.

4. A system for measuring and indicating the transmission characteristics of transmission apparatus over a wide frequency range comprising two substantially identical transmission branches into one of which the insertion branch, said transmission apparatus is adapted to be connected, the other of which is used as a reference branch, means for supplying equal energy portions of the same measuring signal wave of a frequency variable over said wide frequency range to the inputs of both of said branches, means for converting the signal wave in each branch, by heterodyne action, to a wave of fixed low frequency which is the same for each branch and equipment for indicating and measuring accurately the insertion phase of said apparatus comprising two phase sections each including two paths one of which is supplied with a different energy portion of the fixed low frequency output of said insertion branch and the other of which is supplied with a different energy portion of the fixed low frequency output of said reference branch, a 90-degree phase shifter in the input of one only of the paths supplied from said reference branch, constant output amplifying means in the latter path beyond the point of connection of said phase shifter therein, and in the input of each of the other paths, for converting the supplied low frequency waves in these paths to constant and equal amplitudes, means for combining the constant and equal amplitude waves in the two paths of each phase section to produce the vector sum thereof in one path and the vector difference thereof in the other path, and for amplifying and rectifying the resulting vector sum and difference components of the combined waves, a different bridge circuit for differentially combining the resultant rectified quantities in the two paths of each phase section, and a separate phase meter connected in one arm of the bridge circuit in each phase section for indicating the difference between the two rectified quantities as a measure of the phase shift between said insertion and reference branches and thus of the insertion phase of said apparatus.

5. The system of claim 4, in which a measuring circuit is connected across the output of said insertion branch to indicate the change in the amplitude of the low frequency wave output thereof caused by the insertion of said transmission apparatus in that branch, as a measurement of the insertion gain or loss of that apparatus.

6. The system of claim 4 in which the phase meter in each of said phase sections has two scales calibrated directly in degrees, each scale covering a different range of 90 degrees, the phase scales of the meter associated with the phase section including the 90-degree phase shifter in the path thereof fed from said reference branch providing readings of phase shift displaced 90 degrees from the readings of the respective scales on the meter associated with the other phase section, so that the four scales of the two meters cover a full 360 degrees of phase shift and when the phase shift is such that the reading of one meter is on scale the reading of the other meter is off scale, both ends of the scale on both meters being so marked that when a meter reading is off scale, the direction in which it is off indicates to the observer the proper scale to read on the other meter.

7. The system of claim 4, in which the constant output amplifying means in each path of said two phase sections comprises one or more amplifying vacuum tube stages each including a control grid, and an automatic gain control circuit for that amplifier comprising a reference source of direct-current voltage, means for combining the alternating-current voltage appearing in the output of said amplifying means with said reference direct-current voltage, means for selecting the portions of the alternating-current voltage which exceed the direct-current voltage to form a series of wave pips whose amplitudes are proportional to the difference between the two voltages and means for applying the resulting pips as a bias to the controlled amplifier to hold its output voltage constant.

8. A system for making insertion phase measurements on transmission apparatus, comprising two like transmission paths into one of which said apparatus is adapted to be inserted, means for generating and supplying to the inputs of both of said paths equal energy portions of a measuring signal wave of a frequency variable over a wide frequency range, means for deriving from the output of said generating and supplying means other waves of a frequency which is at all times displaced from that of the generated measuring signal wave by exactly a given frequency lower than the lowest frequency in said range, an auxiliary source of waves of a frequency equal to said given frequency plus a fixed low frequency, modulating means in said paths for combining the signal waves therein with equal energy portions of said other waves of displaced frequencies to translate the signal waves therein first to said given frequency and then to said fixed frequency, a 90-degree phase shifter and a phase indicator for comparing the outputs of the two paths at said fixed low frequency with said transmission apparatus inserted in one path and said phase shifter effectively inserted in the other path, and for indicating the difference between said outputs as a measure of the insertion phase of said apparatus.

References Cited in the file of this patent

UNITED STATES PATENTS

| | | |
|---|---|---|
| 2,369,066 | Maxwell | Feb. 6, 1945 |
| 2,544,340 | Maxwell | Mar. 6, 1951 |
| 2,617,855 | Etheridge | Nov. 11, 1952 |
| 2,625,589 | Houghton | Jan. 13, 1953 |